(12) United States Patent
Hiscock et al.

(10) Patent No.: US 11,275,984 B1
(45) Date of Patent: Mar. 15, 2022

(54) ELECTRONIC SHELF LABEL (ESL) ANTENNA DESIGN

(71) Applicant: QUALCOMM Incorporated, San Diego, CA (US)

(72) Inventors: Paul Dominic Hiscock, Cambridge (GB); Anthony McFarthing, Ely (GB); Aline Coelho De Souza, Cambridge (GB)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/999,673

(22) Filed: Aug. 21, 2020

(51) Int. Cl.
| | |
|---|---|
| *G06K 19/077* | (2006.01) |
| *H01Q 1/22* | (2006.01) |
| *H01Q 1/38* | (2006.01) |
| *H04W 4/80* | (2018.01) |

(52) U.S. Cl.
CPC ............ *G06K 19/07779* (2013.01); *G06K 19/07767* (2013.01); *H01Q 1/2225* (2013.01); *H01Q 1/38* (2013.01); *H04W 4/80* (2018.02)

(58) Field of Classification Search
CPC .. G06K 19/07779; H01Q 1/2225; H01Q 1/38; H04W 4/80
USPC ..................................................... 235/492
See application file for complete search history.

(56) References Cited

U.S. PATENT DOCUMENTS

| | | | |
|---|---|---|---|
| 10,083,390 B2* | 9/2018 | Kim | G06K 19/077 |
| 2009/0027202 A1 | 1/2009 | Copeland et al. | |
| 2014/0240088 A1* | 8/2014 | Robinette | G08B 13/1427 340/5.61 |
| 2018/0293543 A1* | 10/2018 | Tiwari | G05D 1/0274 |

FOREIGN PATENT DOCUMENTS

| | | |
|---|---|---|
| EP | 3543895 A1 | 9/2019 |
| JP | 2012085404 A | 4/2012 |

OTHER PUBLICATIONS

Partial International Search Report—PCT/US2021/045906—ISA/EPO—dated Nov. 26, 2021.

\* cited by examiner

*Primary Examiner* — Toan C Ly
(74) *Attorney, Agent, or Firm* — Muncy, Geissler, Olds & Lowe, P.C.

(57) ABSTRACT

According to various aspects and technical advantages, an apparatus for electronic shelf labels includes a controller circuit for communicating with communication devices using a contactless communication protocol, a set of two or more antenna coils, each antenna coil located at a known position relative to the controller circuit, and a switch for selectively coupling the controller circuit to one or more of the set of antenna coils. The controller circuit is configured to determine a physical location of a communication device based on which antenna coil from the set of antenna coils the communication device is using to communicate with the controller circuit

45 Claims, 5 Drawing Sheets

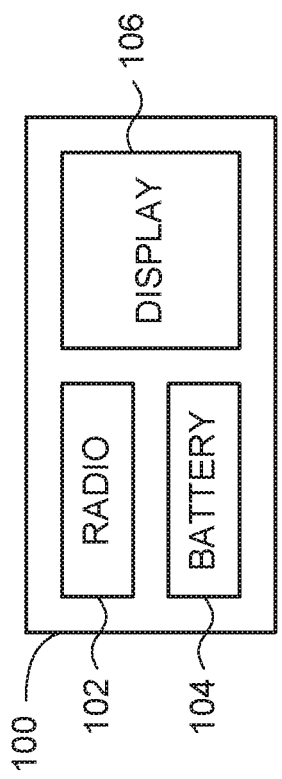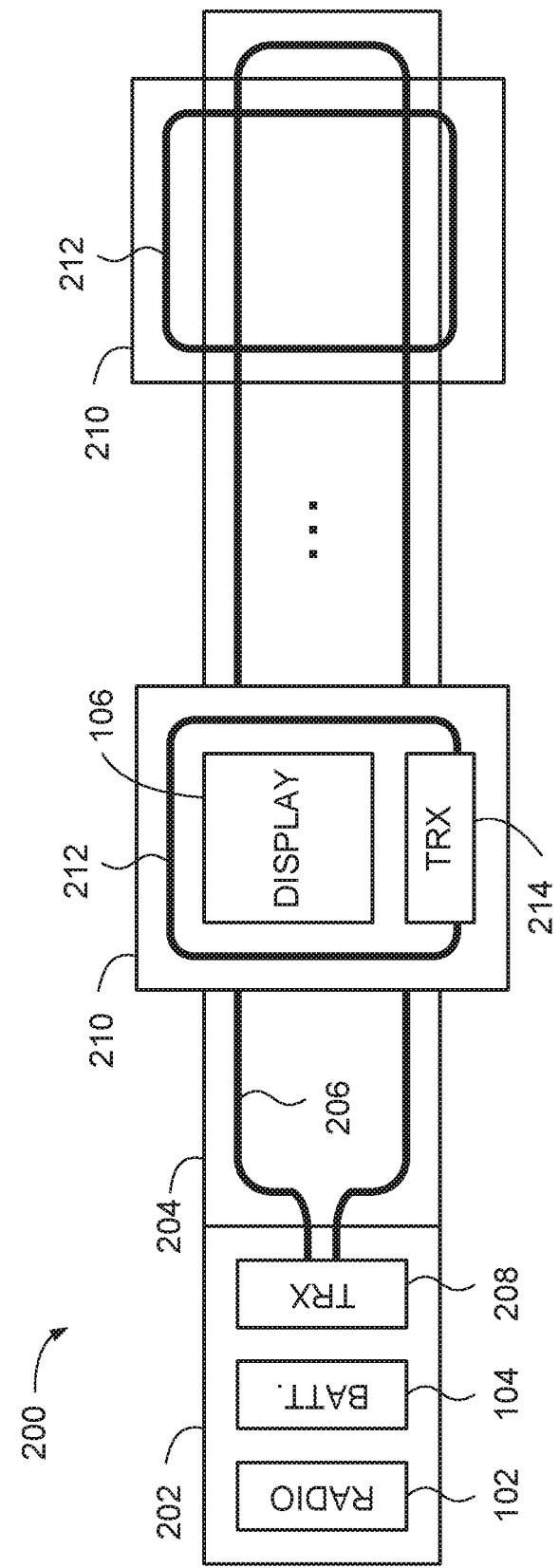

US 11,275,984 B1

ELECTRONIC SHELF LABEL (ESL) ANTENNA DESIGN

FIELD OF DISCLOSURE

The various aspects and embodiments described herein generally relate to electronic shelf labels (ESLs), and more particularly to distributed ESL systems that can determine the physical location of remote ESL units relative to a centralized controller with sufficient resolution.

BACKGROUND

Wireless communication systems are widely used to enable and provide data communication and support for various applications and types of communication content, such as voice, video, data and so on. These wireless communication systems can also be used to implement an electronic shelf label (ESL) based system for an enterprise. ESLs are used to display product information (e.g., price), as well as means for providing an effective way to update the ESLs via the communication network, such as a wireless communication network. An ESL system typically uses lower power processors and central processing units (CPUs) to lower overall power consumption. Also, since ESLs are typically powered by batteries, lower power consumption and maximizing battery life are very important design considerations. An ESL also uses various user interfaces and display units to convey pertinent information to an end user.

FIG. 1 illustrates an conventional, stand-alone ESL unit 100. Stand-alone ESL unit 100 contains a radio 102, a battery 104, and a display 106. The stand-alone ESL unit 100 can be programmed via the radio 102, e.g., to update the price or other information being displayed to shoppers. The conventional, stand-alone ESL unit 100 has several disadvantages, however. One disadvantage is that every stand-alone ESL unit 100 must contain its own radio 102, which increases the cost of each unit.

FIG. 2 illustrates one conventional approach to lower the cost of each ESL unit—namely to have one radio unit service multiple ESL units. In FIG. 2, system 200 includes a controller 202 coupled to a track 204 that includes a coil or loop antenna 206. The controller 202 includes the radio 102 and battery 104, as well as a transceiver (TRX) 208, which communicates with simplified ESL units 210 via a loop antenna 212. Each simplified ESL unit 210 has its own TRX 214 and a display 106. In the conventional approach shown in FIG. 2, each simplified ESL unit 210 can be placed anywhere along the track 204, which is typically a meter long. Multiple simplified ESL units 210 may be placed on the track 204, and the controller 202 uses the loop antenna 206 to provide power to, as well as communicate with, the simplified ESL units 210. Because a simplified ESL unit 210 does not contain a radio, the cost of each unit is lower than the cost of a stand-alone ESL unit 100.

In a typical deployment, the system 200 communicates with the simplified ESL units 210 using the near-field communication (NFC) protocol, and a simplified ESL unit 210 is referred to as a "NFC-ESL" (NESL). Each track 204 can support up to about 20 NESLs, which can be placed anywhere along the track 204. The controller 202 communicates with each NESL using NFC magnetic coupling.

The conventional approach shown in FIG. 2 has several disadvantages, however. One disadvantage is that the location of each simplified ESL unit 210 cannot be determined by the controller 202. Because the magnetic coupling has a very low carrier frequency, the controller 202 cannot use conventional techniques, such as time delay reflectometry, to determine the exact location of a simplified ESL unit 210 along the track 204. The best that the controller 202 can determine is whether or not the simplified ESL unit 210 in question is present on track 204 or not. This is a problem for supermarkets, which generally follow a planogram, which is a map that specifies what the location of every product in the store should be. Thus, supermarkets desire the ability to determine the position of an ESL unit to within 10 cm, or, barring that, the order of ESL units along the track 204, neither of which can be done by system 200.

Another disadvantage of system 200 is due to the poor coupling efficiency between the large loop antenna 206 on the track 204 and the small loop antenna 212 on each simplified ESL unit 210. Because of the poor coupling efficiency, the controller 202 must generate a large signal on the loop antenna 206 so that the loop antenna 212 can detect it. This results in larger power consumption and lower battery life for controller 202.

SUMMARY

The following information presents a simplified summary relating to one or more aspects, technical advantages and/or embodiments disclosed herein. As such, the following summary should not be considered an extensive overview relating to all contemplated aspects and/or embodiments, nor should the following summary be intended to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects and technical advantages, an apparatus for electronic shelf labels includes a controller circuit for communicating with communication devices using a contactless communication protocol, a set of two or more antenna coils, each antenna coil located at a known position relative to the controller circuit, and a switch for selectively coupling the controller circuit to one or more of the set of antenna coils. The controller circuit is configured to determine a physical location of a communication device based on which antenna coil from the set of antenna coils the communication device is using to communicate with the controller circuit.

According to various aspects and technical advantages, a method for electronic shelf labels includes: providing a controller circuit for communicating with communication devices using a contactless communication protocol; providing a set of two or more antenna coils, each antenna coil located at a known position relative to the controller circuit; and providing a switch for selectively coupling the controller circuit to one or more of the set of antenna coils. The controller circuit is configured to determine a physical location of a communication device based on which antenna coil from the set of antenna coils the communication device is using to communicate with the controller circuit.

According to various aspects and technical advantages, an apparatus for electronic shelf labels includes a controller circuit means for communicating with communication device means using a contactless communication protocol, a set of two or more antenna coil means, each antenna coil means located at a known position relative to the controller circuit means, and a switch means for selectively coupling the controller circuit means to one or more of the set of antenna coil means. The controller circuit means is configured to determine a physical location of a communication device means based on which antenna coil means from the set of antenna coil means the communication device means is using to communicate with the controller circuit means.

According to other various aspects and technical advantages, a computer-readable storage medium, having computer-executable instructions recorded thereon, the computer-executable instructions configured to cause a controller circuit having one or more processors to perform the following functions: determine which of a plurality of antenna coils that are electrically coupled to the controller circuit a communication device is using to communicate with the controller circuit; and determine a physical location of a communication device based on which of the plurality of antenna coils the communication device is using to communicate with the controller circuit.

According to other various aspects and technical advantages, an Electronic Shelf Label (ESL) system includes an ESL apparatus and at least one communication device. The ESL apparatus includes a controller circuit for communicating with communication devices using a contactless communication protocol, a set of two or more antenna coils, each antenna coil located at a known position relative to the controller circuit, and a switch for selectively coupling the controller circuit to one or more of the set of antenna coils. The controller circuit is configured to determine a physical location of a communication device based on which antenna coil from the set of antenna coils the communication device is using to communicate with the controller circuit. Each communication device includes a transceiver and antenna coil for communicating using a contactless communication protocol, and a display.

Other objects and technical advantages associated with the aspects and embodiments disclosed herein will also be apparent to those skilled in the art, based on the accompanying drawings, and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which:

FIG. 1 illustrates an conventional, stand-alone ESL unit;

FIG. 2 illustrates one conventional approach to lower the cost of each ESL unit;

DETAILED DESCRIPTION

Figure 3:
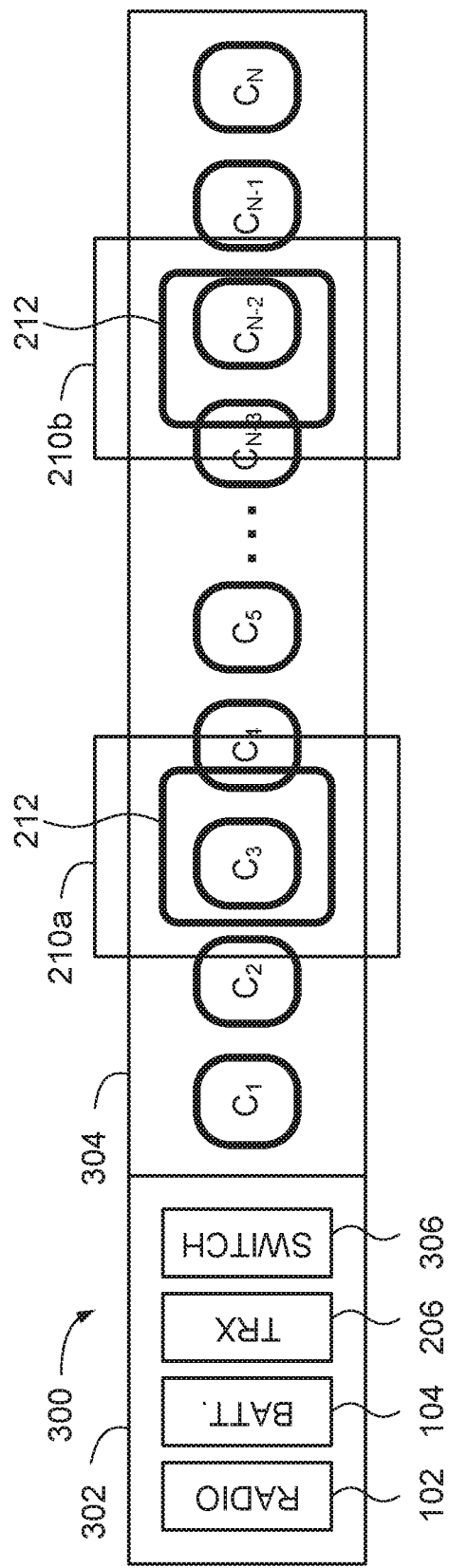
FIG. 3 illustrates an exemplary ESL apparatus according to some aspects of the disclosure.

Various aspects and embodiments are disclosed in the following description and related drawings to show specific examples relating to exemplary aspects and embodiments. Alternate aspects and embodiments will be apparent to those skilled in the pertinent art upon reading this disclosure, and they may also be constructed and practiced without departing from the scope or spirit of the disclosure. Additionally, well-known elements will not be described in detail or may be omitted, so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

Wireless communication systems are widely used to enable and provide data communication and support for various applications and types of communication content, such as voice, video, data and so on. These wireless communication systems can also be used to implement an Electronic Shelf Label (ESL) based system for an enterprise. ESLs are used to display product information (e.g., price), as well as means for providing an effective way to update the ESLs via the communication network, such as a wireless communication network. An ESL system typically uses lower power processors and central processing units (CPUs) to lower overall power consumption. Also, since ESLs are typically powered by batteries, lower power consumption and maximizing battery life are very important design considerations. An ESL also uses various user interfaces and display units to convey pertinent information to an end user.

FIG. 3 illustrates an exemplary apparatus 300 according to some aspects of the disclosure. In FIG. 3, the apparatus 300 includes a controller circuit 302 for communicating with communications devices 210 using a contactless communication protocol. The apparatus 300 includes a set of two or more antenna coils 304, where each coil (labeled $C_1$ through $C_N$ in FIG. 3) is located at a known position relative to the controller circuit 302. The apparatus 300 includes a switch 306 for selectively coupling the controller circuit 302 or components thereof to one or more or of the antenna coils in the set. To reduce visual clutter, the electrical connections between the components within the controller circuit 302 and between the switch 306 and the individual coils $C_1$ through $C_N$ are not shown in FIG. 3. The controller circuit 302 is configured to determine a physical location of a communication device 210 based on which antenna coil ($C_1$ through $C_N$) the communication device 210 is using to communicate with the controller circuit 302. In some aspects, the switch 306 selectively couples the controller circuit 302 to one of the coils at a time.

In some aspects, the controller circuit 302 includes a transceiver (TRX) 208 for communicating with the communication devices 210 via the set of two or more antenna coils 304. In these aspects, the switch 306 couples the transceiver 208 to one or more of the antenna coils 304 at a time, and the transceiver 208 communicates (or attempts to communicate) with a communication device 210, if such device is present and proximate to the coil(s) selected by the switch 306. In some aspects, the contactless protocol is a magnetic communications protocol or a near field communications protocol. In some aspects, the near field communications protocol may be the near-field communication (NFC) protocol, as standardized in ECMA-340, ISO/IEC 18092, ISO/IEC 14443, and ISO/IEC 15693, although other near field communications protocols may be used. In some aspects, the transceiver 208 includes a near field communications protocol transceiver.

In some aspects, the antenna coils $C_1$ through $C_N$ are arranged linearly or in a grid, and the controller circuit 302 knows the location or spacing of each coil. In some aspects, the coils are arranged in series or in a grid at a predefined spacing known to the controller circuit 302. For example, the controller circuit 302 may know that the coils are in a linear array with center-to-center spacing of 10 cm and that the closest coil is 15 cm from the controller circuit. If the controller circuit 302 detects the presence of a communication device 210 (e.g., the controller circuit 302 determines that the communication device 210 is communicating with the controller circuit 302 on the $5^{th}$ coil in the array ($C_5$), the controller circuit 302 can determine that the distance from the controller circuit 302 to the communication device 210 is 15 cm+(5−1)*10 cm=55 cm. Using just this relative distance information the controller circuit 302 can determine the order that multiple communication devices 210 appear on the shelf. If the controller circuit 302 also knows its geographic location or location within the physical premises and the direction the antenna coils 304 are facing, the controller circuit 302 can then calculate a geographic location for each communication device 210, e.g., by adding the relative distance for the particular communication device 210 to the known location and direction of the controller circuit 302.

In some aspects, the antenna coils may be arranged in arbitrary locations that are known to the controller circuit 302. For example, the controller circuit 302 may associate spatial or geographical coordinates with each antenna coil. This allows the antenna coils $C_1$-$C_N$ to be placed in arbitrary locations or arrangements. In these aspects, the controller circuit 302 may determine that a communication device 210 is coupled to coil $C_K$; the controller circuit 302 can look up the spatial or geographic coordinates of coil $C_K$, which the controller circuit 302 can report as the approximate location of that communication device 210.

In some aspects, a communication device 210 may straddle more than one of the antenna coils 304 or may be located between two antenna coils and overlap only one, or none, of the antenna coils 304. In any of these scenarios, a single communications device 210 may register as being present at more than one of the antenna coils 304 from the point of view of the controller circuit 302. In these scenarios, the controller circuit 302 may interpolate between two antenna coils to determine the location of the communications device 210. For example, referring to FIG. 3, the controller circuit 302 may activate antenna coils $C_1$ through $C_N$ in order. When antenna coil $C_3$ is activated, the controller circuit 302 may detect a strong signal from communications device 210a, and when antenna coil $C_4$ is activated, the controller circuit 302 may detect a faint signal from communications device 210a. Based on this information, the controller circuit 302 may infer that the communications device 210a is closer to antenna coil $C_3$ than to antenna coil $C_4$. The estimated location of communications device 210a may be calculated as an interpolation between the known location of antenna coil $C_3$ and the known location of antenna coil $C_4$. In this manner, the location of communications device 210a may be determined with a resolution better than the coil spacing. Likewise, the location of communications device 210b may be interpolated as being between the known location of antenna coil $C_{N-3}$ and the known location of antenna coil $C_{N-2}$. The controller circuit 302 may interpolate the location of the communication device 210 between two or more antenna coils based on the characteristics of the signals received on the antenna coils, such as, but not limited to, the power of the signals received.

In some aspects, the apparatus 300 includes a radio 102 that is a component of the controller circuit 302 or that is communicatively coupled to the controller circuit 302. In some aspects, the radio 102 operates according to a Bluetooth protocol. In some aspects, the apparatus 300 includes a battery 104 for providing power to the controller circuit 302. In some aspects, the controller circuit 302 is configured for communicating with near field communications ESL devices, including, but not limited to, NFC ESL devices.

In some aspects, the controller circuit 302 is configured to detect the presence of a newly-added communication device 210, e.g., by detecting a communication device 210 on an antenna coil on which previously no communication device 210 had been communicating.

In some aspects, the controller circuit 302 is configured to detect the continued presence of a previously-added communication device 210, e.g., by detecting a communication device 210 on an antenna coil on which previously that communication device 210 had been communicating.

In some aspects, the controller circuit 302 is configured to detect the absence of a previously-added communication device 210, e.g., by detecting no communication device 210 on an antenna coil on which previously that communication device 210 had been communicating.

In some aspects, the controller circuit 302 may periodically check all antenna coils for the presence of a communication device 210. In some aspects, the controller circuit 302 may reduce its power consumption by periodically checking only those antenna coils on which a communication device 210 was previously detected, and less frequently checking all of the antenna coils for activity.

In some aspects, the set of antenna coils 304 are located within a laminate substrate, which may be constructed of one or more metallization layers separated by insulating layers. In some aspects, at least part of each antenna coil $C_1$ though $C_N$ is a structure in one or more of the metallization layers.

In some aspects, the antenna coils $C_1$ through $C_N$ are part of a track structure upon which the communications devices 210 are mounted. When mounted, the communication device 210 loop antenna 212 is magnetically coupled to one or more of the antenna coils $C_1$ through $C_N$. In the aspect illustrated in FIG. 3, the coils are mounted adjacent to each other and do not overlap.

Figure 4:
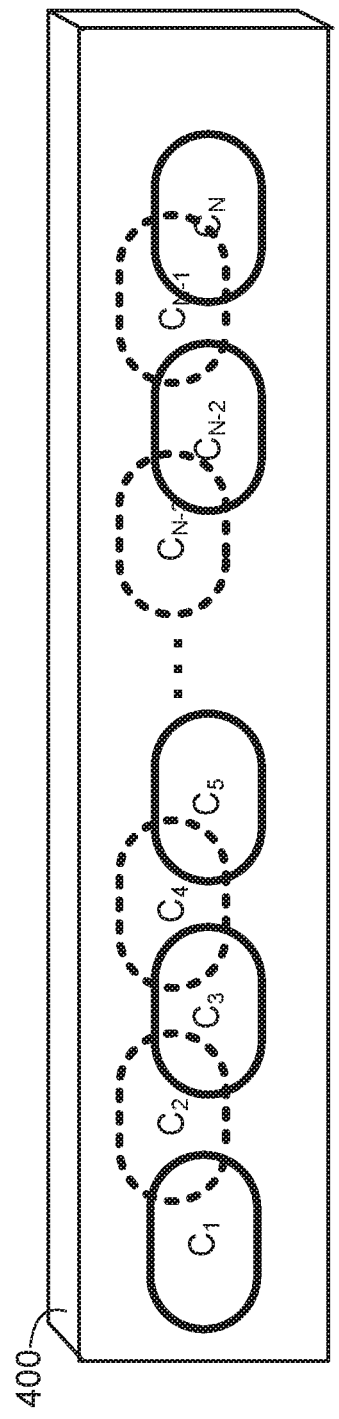
FIG. 4 illustrates an alternative antenna configuration for an exemplary ESL apparatus according to some aspects of the disclosure.

FIG. 4 illustrates an alternative antenna configuration for an exemplary ESL apparatus according to some aspects of the disclosure. In FIG. 4, the antenna coils $C_1$ through $C_N$ are mounted on alternating sides of a fixed or flexible substrate 400 such that each coil does not overlap with the adjacent coil on the same side of the substrate 400 but partially overlaps with the adjacent coil on the opposite side of the substrate 400. Although two layers of coils—one on each side of substrate 400—are shown in FIG. 4, the same principle may be extended to more than two layers of coils as well as to coils having different overlap patterns (or no overlap at all).

In some aspects, the antenna configuration illustrated in FIG. 4 can be used to increase the size of each coil, which provides better coupling to the communication devices 210 and thus reduces power consumption and increases the battery life of the controller circuit 302.

In some aspects, the multi-sided antenna configuration illustrated in FIG. 4 can be used to give a merchant the option to use two different coil spacings, e.g., if the coils on one side of the substrate had a narrower spacing and the coils on the other side of the substrate had a wider spacing. In that configuration, the merchant could mount the coils with the desired spacing facing upward. In some aspects, a coil on one side of the substrate would be electrically connected to a corresponding coil on the other side of the substrate, i.e., the corresponding coils having the undesired spacing would still be activated, but unused.

In some aspects, the coils are mounted at locations that can be specified by the end user, e.g., on or within a sheet of plastic or other material. This would allow the customized layout to be used for tools, accessories, or other variously shaped objects to be displayed in an irregular, unusual, or particular arrangement. The arbitrary locations are not limited to placement in two-dimensional space but may also be defined in three dimensional space.

Figure 5:
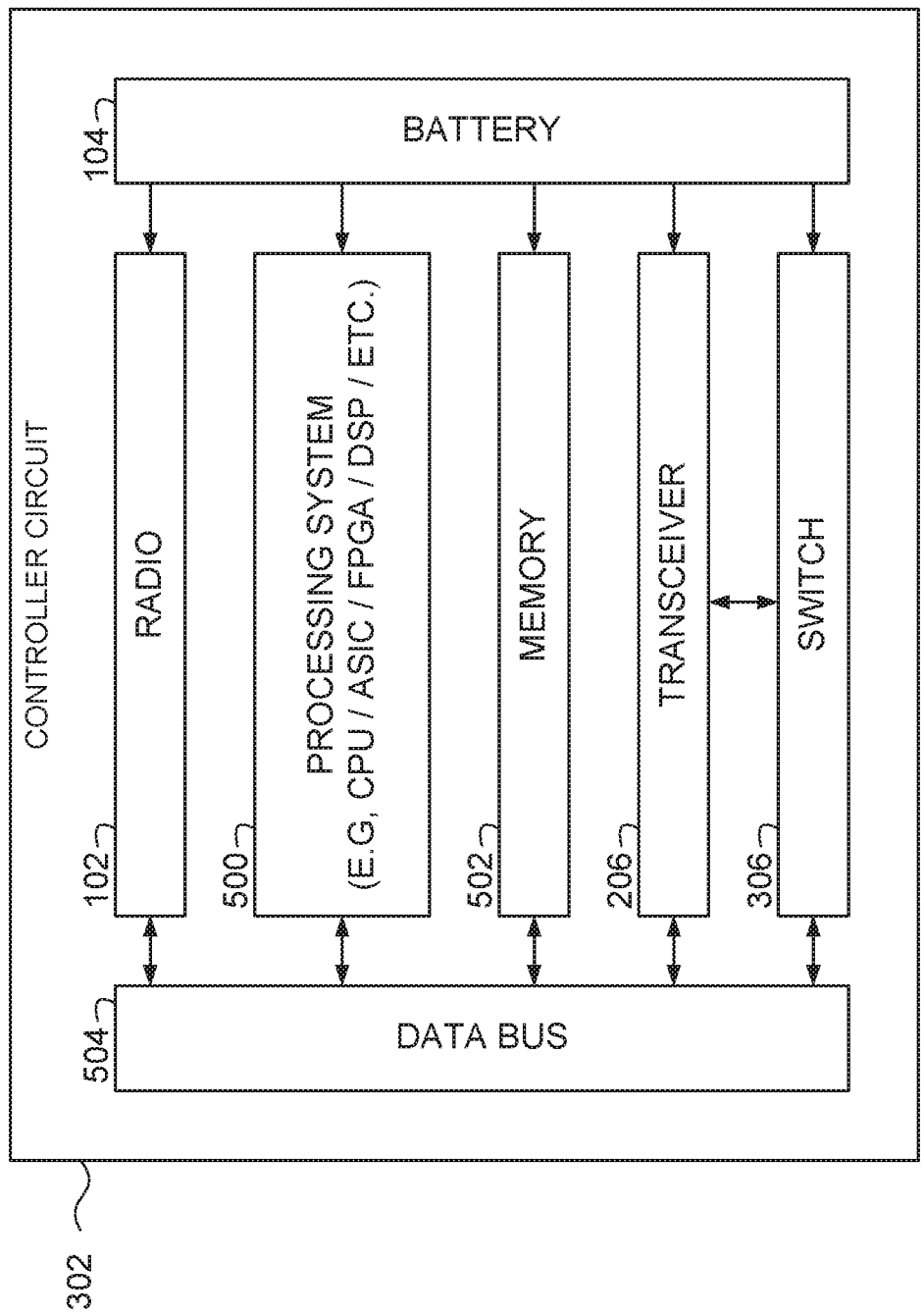
FIG. 5 illustrates an exemplary controller circuit of an ESL apparatus according to some aspects of the disclosure.

FIG. 5 illustrates an exemplary controller circuit 302 of an apparatus 300 according to some aspects of the disclosure. In FIG. 5, the controller circuit 302 includes several components, including a radio 102, which may be a Bluetooth radio or other wireless communication protocol. The controller circuit 302 includes a processing system 500, which may include a central processing unit (CPU), an application specific integrated circuit (ASIC), a field programmable gate array (FPGA), a digital signal processor (DSP), or other processing circuitry. The controller circuit 302 includes memory 502, which may be used by the processing system 500 or other component within the controller circuit 302. The controller circuit 302 includes a transceiver 208 for communicating with communication devices 210 using a contactless protocol. In some aspects, the contactless protocol is a magnetic communications protocol or a near field communications protocol. including, but not limited to, the near-field communication (NFC) protocol as standardized in ECMA-340 and ISO/IEC 18092. The controller circuit 302 includes a data bus 504, which provides communication between at least some of the components of the controller circuit 302. The controller circuit 302 includes a battery 104, which provides power to at least some of the components of the controller circuit 302. It will be understood that the example shown in FIG. 5 is illustrative and not limiting. The controller circuit 302 may include other components not shown in FIG. 5. Likewise, the electrical connections between the components of the controller circuit 302 may be different from those shown in FIG. 5 and still remain within the intended scope of the subject matter disclosed herein.

Figure 6:
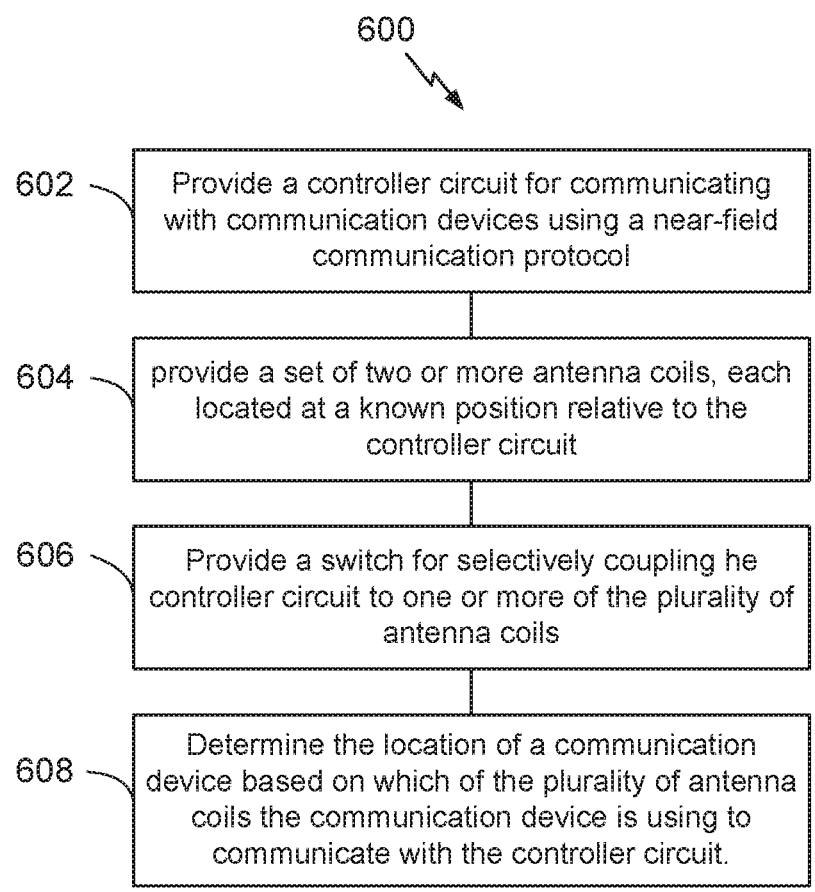
FIG. 6 illustrates an exemplary method according to some aspects of the disclosure.

FIG. 6 illustrates an exemplary method 600 according to some aspects of the disclosure. In some aspects, the method 600 includes, at 602, providing a controller circuit 302 for communicating with communication devices 210 using a contactless communication protocol; at 604, providing a set of two or more antenna coils 304, each located at a known position relative to the controller circuit 302; at 606, providing a switch for selectively coupling the controller circuit 302 to one or more of the plurality of antenna coils 304; and at 608, determining a physical location of a communication device 210 based on which of the plurality of antenna coils 304 the communication device 210 is using to communicate with the controller circuit 302.

Figure 7:
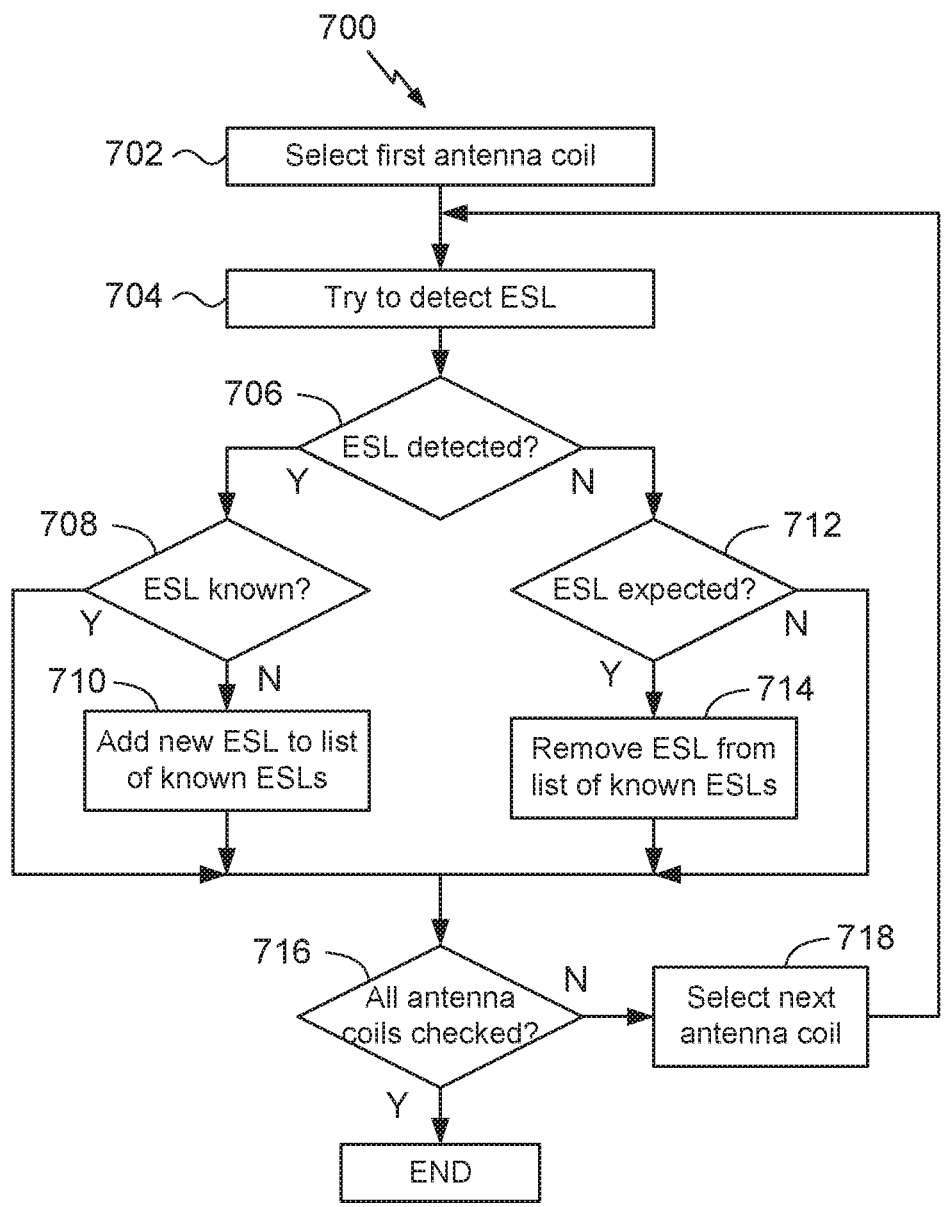
FIG. 7 illustrates an exemplary method 700 for discovery according to some aspects of the disclosure.

FIG. 7 illustrates an exemplary method 700 for discovery according to some aspects of the disclosure. The method 700 may be performed by the controller circuit 302. In some aspects, the method 700 includes, at 702, selecting a first antenna coil from the set of antenna coils 304. The method 700 includes, at 704, trying to detect a communications device 210 (e.g., an ESL), using the selected antenna coil. The method 700 includes, at 706, determining whether an ESL was detected using the selected antenna coil.

If, at 706, an ESL was detected, then at 708, it is determined whether the detected ESL is known, i.e., whether the detected ESL was previously detected using the selected antenna coil. If not, then at 710, the detected ESL is considered "new" and added to the list of known ESLs, and the process goes to 716. If, at 708, the ESL was already known, then the process goes to 716 directly.

If, at 706, an ESL was not detected, then, at 712, it is determined whether an ESL was expected, i.e., whether an ESL was previously detected using that coil. If so, then, at 714, that previously detected ESL is considered "removed" and removed from the list of known ESLs, and the process goes to 716. If, at 712, an ESL was not expected, then the process goes to 716 directly.

The method 700 includes, at 716, determining if all antenna coils have been checked. If not, then at 718, the next antenna coil is selected, and the process loops again starting from 704. If, at 716, all antenna coils have been checked, then the process stops.

In some aspects, the process illustrated in FIG. 7 may be used to check all of the antenna coils 304, or it may be used to check only a subset of the antenna coils 304, e.g., it may be used to check only those coils known to have previously been occupied by communications devices 210. In some aspects, the process illustrated in FIG. 7 may be used to test all of the antenna coils at some times, and to test only a subset of the antenna coils at other times.

Some of the technical advantages associated with the apparatus and methods disclosed herein include the ability to use an inexpensive, radio-less ESL device in a system that overcomes the disadvantages of conventional approaches by providing a mechanism by which the relative or absolute position of each inexpensive ESL device can be determined with an accuracy sufficient for use cases such as supermarkets, for example. Another technical advantage is that the magnetic coupling efficiency between the described apparatus and inexpensive ESL devices is better than the magnetic coupling efficiency in conventional systems, which results in lower power consumption and better battery life. The coupling efficiency is improved in part because the sizes of the antenna coils of the apparatus 300 and the communications device 210 are similar in size, and in part because in some aspects only one of the antenna coils 304 is used at a time.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, etc.).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an Internet of Things (IoT) device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. An apparatus for electronic shelf labels, comprising:
    a controller circuit for communicating with communication devices using a contactless communication protocol;
    a plurality of antenna coils, each located at a known position relative to the controller circuit; and
    a switch for selectively coupling the controller circuit to one of the plurality of antenna coils at a time;
    wherein the controller circuit is configured to determine a physical location of a communication device based on which of the plurality of antenna coils the communication device is using to communicate with the controller circuit.

2. The apparatus of claim 1, wherein the antenna coils in the plurality of antenna coils are arranged linearly or in a grid.

3. The apparatus of claim 2, wherein the antenna coils in the plurality of antenna coils are arranged at a predefined spacing known to the controller circuit.

4. The apparatus of claim 1, wherein the antenna coils in the plurality of antenna coils are arranged in arbitrary locations known to the controller circuit.

5. The apparatus of claim 1, wherein the controller circuit is configured to determine the physical location of a communication device by interpolating a distance of the communication device between at least some of the plurality of antenna coils.

6. The apparatus of claim 5, wherein the controller circuit interpolates a distance of a communication device between at least some of the plurality of antenna coils based on characteristics of signals received on the plurality of antenna coils.

7. The apparatus of claim 1, further comprising a radio that is a component of the controller circuit or that is communicatively coupled to the controller circuit.

8. The apparatus of claim 7, wherein the radio operates according to a Bluetooth protocol.

9. The apparatus of claim 1, further comprising a battery for providing power to the controller circuit.

10. The apparatus of claim 1, wherein the controller circuit is configured for communicating with electronic shelf label devices.

11. The apparatus of claim 1, wherein the controller circuit is further configured to detect a presence of a newly-added communication device, a continued presence of a previously-added communication device, and/or an absence of a previously-added communication device.

12. The apparatus of claim 11, wherein the controller circuit is configured to detect the presence of a newly-added communication device by detecting a communication device on an antenna coil on which previously no communication device was communicating.

13. The apparatus of claim 11, wherein the controller circuit is configured to detect the continued presence of a previously-added communication device by detecting a communication device on an antenna coil on which previously that communication device was communicating.

14. The apparatus of claim 13, wherein the controller circuit only checks antenna coils of the plurality of antenna coils on which communication devices were previously communicating.

15. The apparatus of claim 11, wherein the controller circuit is configured to detect the absence of a previously-added communication device by detecting no communication device on an antenna coil on which previously that communication device was communicating.

16. The apparatus of claim 11, wherein the controller circuit checks each antenna coil in the plurality of antenna coils.

17. The apparatus of claim 1, wherein the plurality of antenna coils are disposed in a laminate substrate.

18. The apparatus of claim 17, wherein the laminate substrate comprises a one or more metallization layers separated by insulating layers.

19. The apparatus of claim 18, wherein each of the plurality of antenna coils is comprised of a structure in at least one of the one or more metallization layers.

20. The apparatus of claim 1, wherein the contactless communication protocol comprises a near-field communication protocol.

21. The apparatus of claim 20, wherein the controller circuit comprises a near-field communication transceiver for communicating with communication devices using a near-field communication protocol.

22. A method for electronic shelf labels, comprising:
providing a controller circuit for communicating with communication devices using a contactless communication protocol;
providing a plurality of antenna coils, each located at a known position relative to the controller circuit; and
providing a switch for selectively coupling the controller circuit to one of the plurality of antenna coils at a time;
wherein the controller circuit is configured to determine a physical location of a communication device based on which of the plurality of antenna coils the communication device is using to communicate with the controller circuit.

23. The method of claim 22, wherein the antenna coils [C1-Cn] in the plurality of antenna coils are arranged linearly or in a grid.

24. The method of claim 23, wherein the antenna coils in the plurality of antenna coils are arranged at a predefined spacing known to the controller circuit.

25. The method of claim 22, wherein the antenna coils [C1-Cn] in the plurality of antenna coils are arranged in arbitrary locations known to the controller circuit.

26. The method of claim 22, wherein the controller circuit is configured to determine the physical location of a communication device by interpolating a distance of the communication device between at least some of the plurality of antenna coils.

27. The method of claim 26, wherein the controller circuit is configured to interpolate a distance of a communication device between at least some of the plurality of antenna coils based on characteristics of signals received on the plurality of antenna coils.

28. The method of claim 22, further comprising a radio that is a component of the controller circuit or that is coupled to the controller circuit.

29. The method of claim 28, wherein the radio is configured to operate according to a Bluetooth protocol.

30. The method of claim 22, further comprising a battery for providing power to the controller circuit.

31. The method of claim 22, wherein the controller circuit is configured to communicate with electronic shelf label devices.

32. The method of claim 22, wherein the controller circuit is further configured to detect a presence of a newly-added communication device, a continued presence of a previously-added communication device, and/or an absence of a previously-added communication device.

33. The method of claim 32, wherein the controller circuit is configured to detect the presence of a newly-added communication device by detecting a communication device on an antenna coil on which previously no communication device was communicating.

34. The method of claim 32, wherein the controller circuit is configured to detect the continued presence of a previously-added communication device by detecting a communication device on an antenna coil on which previously that communication device was communicating.

35. The method of claim 34, wherein the controller circuit is configured to only check antenna coils on which communication devices were previously communicating.

36. The method of claim 32, wherein the controller circuit is configured to detect the absence of a previously-added communication device by detecting no communication device on an antenna coil on which previously that communication device was communicating.

37. The method of claim 32, wherein the controller circuit is configured to check each antenna coil in the plurality of antenna coils.

38. The method of claim 22, wherein the plurality of antenna coils are disposed in a laminate substrate.

39. The method of claim 38, wherein the laminate substrate comprises a one or more metallization layers separated by insulating layers.

40. The method of claim 39, wherein each of the plurality of antenna coils is comprised of a structure in at least one of the one or more metallization layers.

41. The method of claim 22, wherein the contactless communication protocol comprises a near-field communication protocol.

42. The method of claim 41, wherein providing the controller circuit comprises providing a near-field communication transceiver for communicating with communication devices using a near-field communication protocol.

43. An apparatus for electronic shelf labels, comprising:
a controller circuit means for communicating with communication device means using a contactless communication protocol;
a plurality of antenna coil means, each located at a known position relative to the controller circuit means; and
a switch means for selectively coupling the controller circuit means to one of the plurality of antenna coil means at a time;
wherein the controller circuit means is configured to determine a physical location of a communication device means based on which of the plurality of antenna coil means the communication device means is using to communicate with the controller circuit means.

44. A computer-readable storage medium having computer-executable instructions recorded thereon, the computer-executable instructions configured to cause a controller circuit having one or more processors to:
determine which one of a plurality of antenna coils that are electrically coupled to the controller circuit a communication device is using to communicate with the controller circuit; and
determine a physical location of a communication device based on which of the plurality of antenna coils the communication device is using to communicate with the controller circuit.

45. A electronic shelf label system comprising:
an electronic shelf label apparatus comprising: a controller circuit for communicating with communication devices using a contactless communication protocol; a plurality of antenna coils, each located at a known position relative to the controller circuit; and a switch for selectively coupling the controller circuit to one of the plurality of antenna coils at a time; wherein the controller circuit is configured to determine a physical location of a communication device based on which of the plurality of antenna coils the communication device is using to communicate with the controller circuit; and
at least one communication device, each communication device comprising: transceiver and loop antenna for communicating using a contactless communication protocol; and a display.

* * * * *